(12) United States Patent
Xu et al.

(10) Patent No.: US 11,922,906 B2
(45) Date of Patent: Mar. 5, 2024

(54) FRAME RATE ADJUSTMENT METHOD, APPARATUS AND DEVICE, COMPUTER-READABLE STORAGE MEDIUM AND COMPUTER PROGRAM PRODUCT

(71) Applicant: Tencent Technology (Shenzhen) Company Limited, Shenzhen (CN)

(72) Inventors: Shili Xu, Shenzhen (CN); Kai Hong, Shenzhen (CN); Haiyang Wu, Shenzhen (CN); Qitian Zhang, Shenzhen (CN); Zhuan Liu, Shenzhen (CN); Jingjing Chen, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 17/954,842

(22) Filed: Sep. 28, 2022

(65) Prior Publication Data

US 2023/0028898 A1 Jan. 26, 2023

Related U.S. Application Data

(63) Continuation of application No. PCT/CN2021/123826, filed on Oct. 14, 2021.

(30) Foreign Application Priority Data

Nov. 9, 2020 (CN) .......................... 202011242460.7

(51) Int. Cl.
*G09G 5/395* (2006.01)
(52) U.S. Cl.
CPC ....... *G09G 5/395* (2013.01); *G09G 2330/021* (2013.01); *G09G 2340/0435* (2013.01)

(58) Field of Classification Search
CPC ............. G09G 5/395; G09G 2330/021; G09G 2340/0435; H04N 7/0127; H04N 13/139
See application file for complete search history.

(56) References Cited

U.S. PATENT DOCUMENTS 10,127,883 B2 * 11/2018 Wang ...................... G09G 5/006
10,891,915 B2 * 1/2021 Koo ......................... G09G 5/10
(Continued)

FOREIGN PATENT DOCUMENTS

| CN | 108646906 A | 10/2018 |
| CN | 110300327 A | 10/2019 |

(Continued)

OTHER PUBLICATIONS

International Search Report and Written Opinion for International Application No. PCT/CN2021/123826 dated Jan. 13, 2022 including translation of International Search Report (13 pages).

*Primary Examiner* — Antonio A Caschera
(74) *Attorney, Agent, or Firm* — Crowell & Moring LLP

(57) ABSTRACT

A frame rate adjustment method, apparatus and device, a computer-readable storage medium and a computer program product. The method includes: acquiring running data of a client during running in a foreground when the client in the terminal device supports dynamic frame rate switching; determining a running scenario of the client based on the running data; determining a target running frame rate of the client based on the running scenario; and performing, by the client, image outputting according to the target running frame rate, and triggering an operating system of the terminal device to adjust a refresh rate of a screen according to the target running frame rate.

18 Claims, 6 Drawing Sheets

(56) References Cited

U.S. PATENT DOCUMENTS

| | | | | |
|---|---|---|---|---|
| 11,328,661 B2* | 5/2022 | Lee | ................ | G09G 3/3208 |
| 2014/0368519 A1* | 12/2014 | Wood | ................ | G06F 3/14 |
| | | | | 345/545 |
| 2017/0092340 A1 | 3/2017 | Zheng | | |

FOREIGN PATENT DOCUMENTS

| | | | |
|---|---|---|---|
| CN | 110377251 A | 10/2019 | |
| CN | 110633003 A | 12/2019 | |
| CN | 110795056 A | 2/2020 | |
| CN | 112230758 A | 1/2021 | |
| WO | WO 2018/161572 A1 | 9/2018 | |

* cited by examiner

FRAME RATE ADJUSTMENT METHOD, APPARATUS AND DEVICE, COMPUTER-READABLE STORAGE MEDIUM AND COMPUTER PROGRAM PRODUCT

RELATED APPLICATION

This application is a continuation of International Application No. PCT/CN2021/123826, filed Oct. 14, 2021, which claims priority to Chinese Patent Application No. 202011242460.7 filed on Nov. 9, 2020. The contents of International Application No. PCT/CN2021/123826 and Chinese Patent Application No. 202011242460.7 are each incorporated herein by reference in their entirety.

FIELD OF THE TECHNOLOGY

This application relates to the technical field of image processing, and relates to, but not limited to, a frame rate adjustment method, apparatus and device, a computer-readable storage medium and a computer program product.

BACKGROUND OF THE DISCLOSURE

With the development of a terminal technology, a frame rate supported by an intelligent terminal is increasingly high at present, and 120 frames or even 144 frames are more and more common. A high frame rate brings users smooth screen displaying and a faster touch-control response experience, but also brings higher power consumption and heat. At present, due to the limitation of the heat dissipation capability, an intelligent terminal cannot maintain a high frame rate for a long time. After running for a period of time, the intelligent terminal will activate a high-temperature protection mechanism in case of an excessively high temperature, which causes performance reduction and makes it impossible to support high frame rates.

SUMMARY

An embodiment of this application provides a frame rate adjustment method, which is implemented by a terminal device and includes:
  acquiring running data of a client during running in a foreground when the client in the terminal device supports dynamic frame rate switching;
  determining a running scenario of the client based on the running data;
  determining a target running frame rate of the client based on the running scenario; and
  performing, by the client, image outputting according to the target running frame rate, and triggering an operating system of the terminal device to adjust a refresh rate of a screen according to the target running frame rate.

An embodiment of this application provides a frame rate adjustment apparatus, including:
  a first acquisition module configured to acquire running data of a client during running in a foreground when the client in the terminal device supports dynamic frame rate switching;
  a first determination module configured to determine a running scenario of the client based on the running data;
  a second determination module configured to determine a target running frame rate of the client based on the running scenario; and
  a first outputting module configured to perform, by the client, image outputting according to the target running frame rate, and trigger an operating system of the terminal device to adjust a refresh rate of a screen according to the target running frame rate.

An embodiment of this application provides a terminal device for frame rate adjustment, including:
  a memory, configured to store executable instructions; and
  a processor configured to implement, when executing an executable instruction stored in the memory, the above-mentioned frame rate adjustment method.

An embodiment of this application provides a computer-readable storage medium which stores an executable instruction used for causing a processor to implement the above-mentioned frame rate adjustment method.

An embodiment of this application provides a computer program product including a computer program or an instruction; and the computer program or instruction, when executed by a processor, implements the above-mentioned frame rate adjustment method.

The embodiments of this application have the following beneficial effects:

When a client in a terminal device supports dynamic frame rate switching, running data of the client during running at a foreground is acquired, and the client determines a running scenario based on the running data. Different running scenarios can correspond to different target running frame rates, so that after a running scenario is determined, a target running frame rate of the client is then determined based on the running scenario; next, the client performs image outputting according to the target running frame rate, so as to dynamically adjust the running frame rate of the client, thereby achieving real-time dynamic adjustment of the running frame rate by the client based on the running scenario; and furthermore, the dynamic adjustment is also used for triggering an operating system of the terminal device to adjust a refresh rate of a screen, so that the power consumption can be effectively reduced while the user experience is guaranteed.

DESCRIPTION OF EMBODIMENTS

Figure 1:
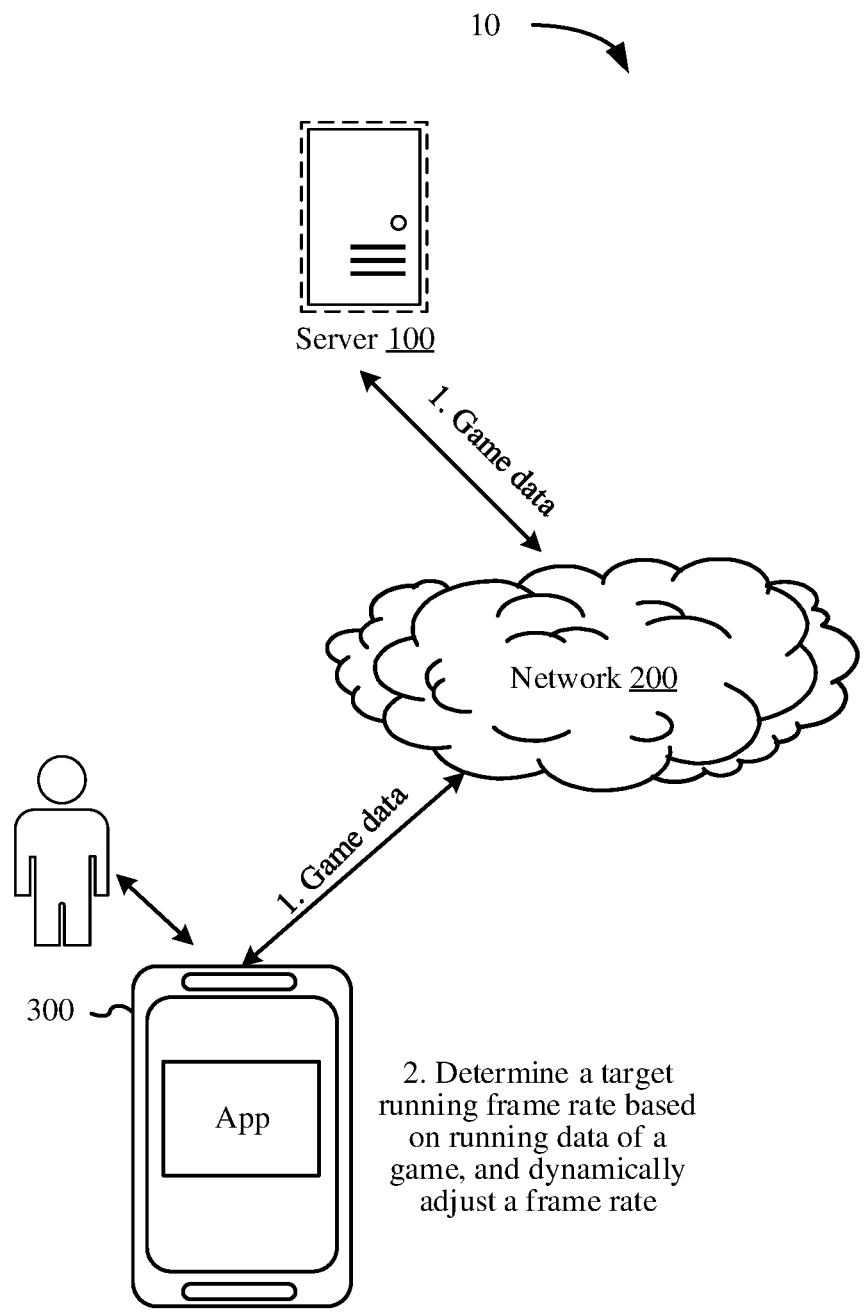
FIG. 1 is a schematic diagram of a network architecture of a frame rate adjustment system 10 provided by an embodiment of this application.

To make the objectives, technical solutions, and advantages of this application clearer, the following describes this application in further detail with reference to the accompanying drawings. The described embodiments are not to be considered as a limitation to this application. All other embodiments obtained by a person of ordinary skill in the art without creative efforts shall fall within the protection scope of this application.

In the following descriptions, related "some embodiments" describe a subset of all possible embodiments. However, it may be understood that the "some embodiments" may be the same subset or different subsets of all the possible embodiments, and may be combined with each other without conflict. Unless otherwise defined, meanings of all technical and scientific terms used in the embodiments of this application are the same as those usually understood by a person skilled in the art to which the embodiments of this application belongs. Terms used in the embodiments of this application are merely intended to describe objectives of the embodiments of this application, but are not intended to limit this application.

Before the embodiments of this application are further described in detail, nouns and terms involved in the embodiments of this application are described. The nouns and terms provided in the embodiments of this application are applicable to the following explanations.

1) Terminal device: It refers to a kind of device that has rich human-machine interaction manners, has the ability to access an Internet, is usually equipped with various operating systems, and has relatively high processing capability. Terminal devices can be divided into mobile terminal devices and moving-inconvenient terminal devices, where the mobile terminal devices include a smart phone, a tablet computer, a vehicle-mounted terminal, a handheld game consoles and the like, and the moving-inconvenient terminal devices include a desktop computer, a laptop computer and the like.

2) Frame rate: frame rate=frames/time, in Frame Per Second (FPS), that is, when the frame rate of an animation is constant at 60 FPS, there are 60 frames within one second.

3) Running frame rate is the number of pictures a client can output per second during running.

4) Refresh rate refers to the number of times a screen can be refreshed per second, in Hertz (Hz). For example, a 144 Hz high refresh rate display means that an upper limit of the physical refresh velocity of the display is displaying 144 pictures per second.

5) Client refers to various application programs running in a terminal device. Clients classified according to use scenarios can include a game client and a player client. Clients classified according to a running platform can include a mobile application (APP) on a mobile terminal device and a client on a computer device.

In order to better understand the frame rate adjustment method provided in this embodiment of this application, the frame rate adjustment method in the related art is first described:

In the related art, the terminal device preferentially guarantees a high frame rate, and is forced to reduce the frame rate when an abnormally high temperature occurs and a sufficient performance support cannot be provided. In the solution provided by the related art, a user will obviously feel an extremely high temperature of the terminal device and can also obviously feel a decrease in the frame rate. As a result, there is an obvious influence on the use experience.

Based on this, an embodiment of this application provides a frame rate adjustment method. A game APP is taken as an example. By means of identifying a game scenario, in terms of a scenario where a user needs to act, a high running frame rate is dynamically supported, so that the best display and touch-control experience is brought to the user; and in terms of a static picture or a scenario where the user does not need to act, the frame rate is dynamically reduced in real time, so that the power consumption and generated heat of the terminal device are reduced. By means of accurate scenario identification, it ensures that scenarios with low running frame rates have no significant impact on the user's game interaction and experience, and at the same time, a significant decrease in the overall power consumption and the running temperature of the terminal device is achieved.

An exemplary application of the terminal device for frame rate adjustment provided in an embodiment of this application is described below. The terminal device for frame rate adjustment provided in this embodiment of this application may be implemented as a notebook computer, a tablet computer, a desktop computer, a mobile device (such as a mobile phone, a portable music player, a personal digital assistant a dedicated message device and a portable game device), an intelligent robot and any other user terminals with a screen display function.

Referring to FIG. 1, FIG. 1 is a schematic diagram of a network architecture of a frame rate adjustment system 10 provided by an embodiment of this application. As shown in FIG. 1, the frame rate adjustment system 10 includes a server 100, a network 200 and a terminal device 300. Furthermore, the terminal device 300 is connected to the server 100 via the network 200. The network 200 may be a wide area network or a local area network, or a combination of the wide area network and the local area network. Various clients are installed on the terminal device 300, such as a game client, a shopping client and a video playback client. When the frame rate adjustment method of this embodiment of this application is implemented, the terminal device 300 displays content displayed by a currently running client on a current display interface. In this embodiment of this application, a game client running in the terminal device 300 is taken as an example for description. The game client acquires game running data from the server 100 via the network 200, determines a current scenario in real time based on the game running data, and adjusts a running frame rate of the game client based on the determined scenario. After the adjustment, the game client informs an operating system of the terminal device 300, so as to trigger the operating system of the terminal device 300 to adjust a refresh rate of a screen. Scenario-based real-time adjustment of the frame rate can be realized, and the power consumption of the terminal device can be effectively reduced, thus ensuring the performance of the terminal device.

Figure 2:
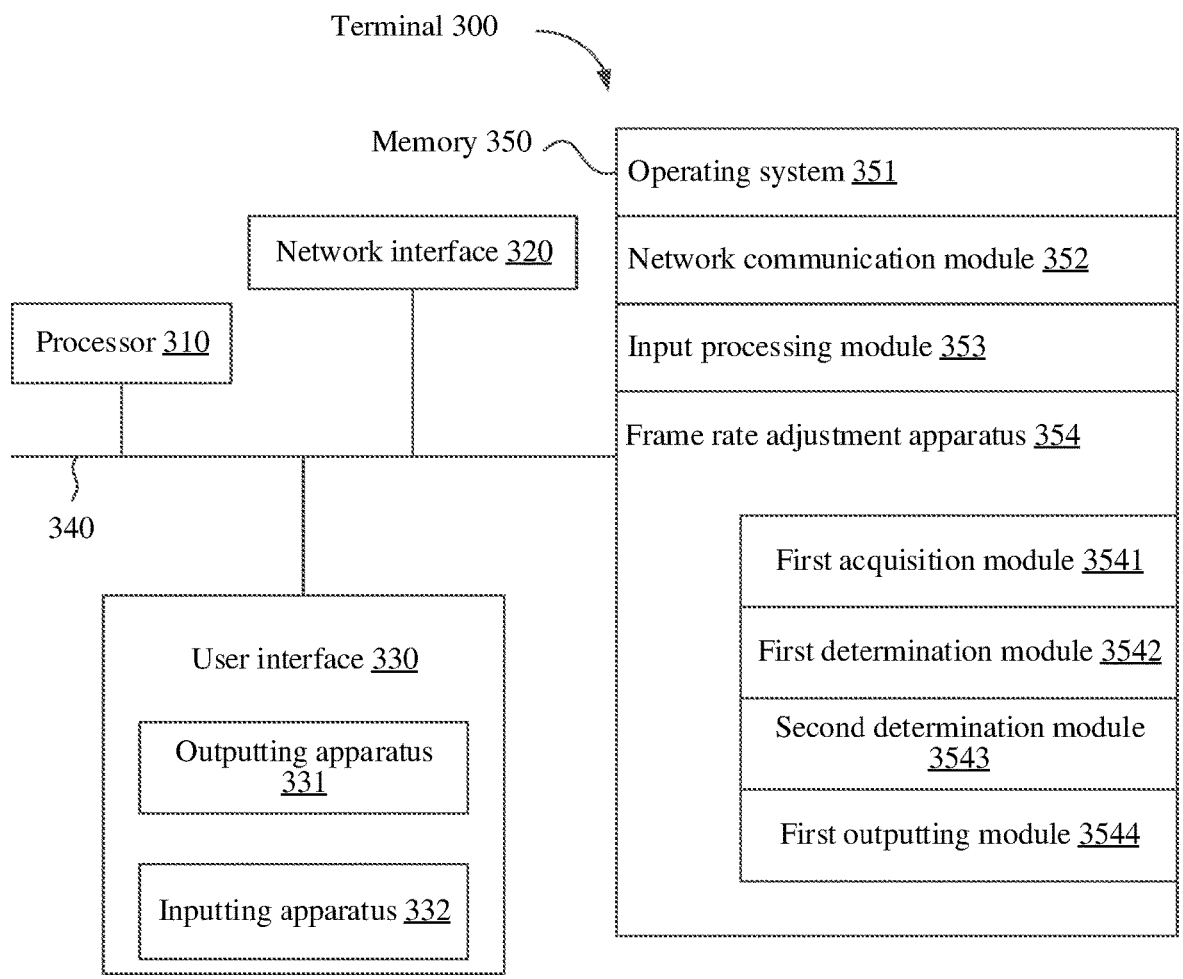
FIG. 2 is a schematic structural diagram of a terminal device 300 provided by an embodiment of this application.

Referring to FIG. 2, FIG. 2 is a schematic structural diagram of a terminal device 300 according to an embodiment of this application. The terminal device 300 shown in FIG. 2 includes at least one processor 310, a memory 350, at least one network interface 320, and a user interface 330. All the components in the terminal device 300 are coupled together by a bus system 340. It may be understood that the bus system 340 is configured to implement connection and communication between the components. In addition to a data bus, the bus system 340 further comprises a power bus, a control bus, and a state signal bus. However, for ease of clear description, all types of buses are marked as the bus system 340 in FIG. 2.

The processor 310 may be an integrated circuit chip having a signal processing capability, for example, a general purpose processor, a DSP, or another PLD, discrete gate, transistor logical device, or discrete hardware component.

The general purpose processor may be a microprocessor, any conventional processor, or the like.

The user interface 330 comprises one or more output apparatuses 331 that can display media content, comprising one or more speakers and/or one or more visual display screens. The user interface 330 further comprises one or more input apparatuses 332, comprising user interface components that facilitate inputting of a user, such as a keyboard, a mouse, a microphone, a touch display screen, a camera, and other input button and control.

The memory 350 may be a removable memory, a non-removable memory, or a combination thereof. Exemplary hardware devices comprise a solid-state memory, a hard disk drive, an optical disc driver, or the like. The memory 350 alternatively includes one or more storage devices away from the processor 310 in physical positions. The memory 350 comprises a volatile memory or a non-volatile memory, or may comprise both a volatile memory and a non-volatile memory. The non-volatile memory may be a read-only memory (ROM). The volatile memory may be a random access memory (RAM). The memory 350 described in this embodiment of this application is to comprise any other suitable type of memories. In some embodiments, the memory 350 may store data to support various operations. Examples of the data comprise a program, a module, and a data structure, or a subset or a superset thereof, which are described below by using examples.

An operating system 351 comprises a system program configured to process various basic system services and perform a hardware-related task, such as a framework layer, a core library layer, or a driver layer, and is configured to implement various basic services and process a hardware-based task.

A network communication module 352 is configured to reach another computing device through one or more (wired or wireless) network interfaces 320. Exemplary network interfaces 320 comprise: Bluetooth, wireless compatible authentication (Wi-Fi), a universal serial bus (USB), and the like.

An input processing module 353 is configured to detect one or more user inputs or interactions from one of the one or more input apparatuses 332 and translate the detected input or interaction.

In some embodiments, the apparatus provided in the embodiments of this application may be implemented by using software. FIG. 2 illustrates a frame rate adjustment apparatus 354 stored in the memory 350. The frame rate adjustment apparatus 354 may be a frame rate adjustment apparatus in the terminal device 300, which may be software in a form such as a program and a plug-in and includes the following software modules: a first acquisition module 3541, a first determination module 3542, a second determination module 3543 and a first outputting module 3544. These modules are logic, and thus can be randomly combined or further split according to functions realized. The following describes functions of the modules.

In some other embodiments, the apparatus provided in the embodiments of this application may be implemented by using hardware. For example, the apparatus provided in this embodiment of the application may be a processor in a form of a hardware decoding processor, programmed to perform the frame rate adjustment method provided in the embodiments of the application. For example, the processor in the form of a hardware decoding processor may use one or more application-specific integrated circuits (ASIC), a DSP, a programmable logic device (PLD), a complex programmable logic device (CPLD), a field-programmable gate array (FPGA), or other electronic components.

Figure 3:
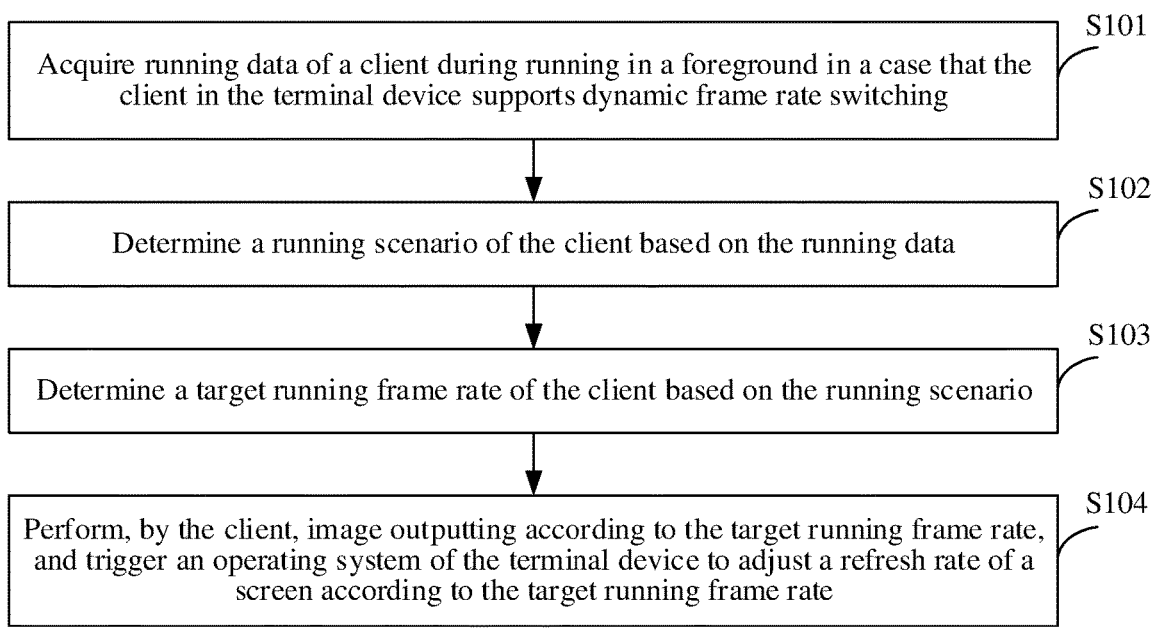
FIG. 3 is a flowchart of a frame rate adjustment method provided by an embodiment of this application.

The frame rate adjustment method provided in an embodiment of this application will be described below in combination with exemplary application and implementation of the terminal device 300 provided in this embodiment of this application. Referring to FIG. 3, FIG. 3 is a flowchart of a frame rate adjustment method provided by an embodiment of this application. The frame rate adjustment method will be described in combination with the steps shown in FIG. 3.

Step S101: Acquire running data of the client during running in a foreground in a case that a client in the terminal device supports dynamic frame rate switching.

The client may be a game client, an instant messaging client, a video playback client, a shopping client, a browser, or the like. During implementation of step S101, when the client supports dynamic frame rate switching, the client acquires its running data during the running in the foreground. The running data may include picture information of a displayed picture and user operation data. For example, the picture information may be image data of an image rendered and outputted by the client in the running process. For example, the picture information may include a pixel value of each pixel pint of the rendered and outputted image. The user operation data may include time point information when a user triggers each operation, location of user's operation, a pressure value of the user's operation and other information.

Step S102: Determine a running scenario of the client based on the running data.

The running scenario may include at least a high frame rate running scenario (a scenario with the running frame rate greater than a frame rate threshold) and a low frame rate running scenario (a scenario with the running frame rate less than the frame rate threshold). In some embodiments, the running scenario may also include a medium frame rate running scenario.

The embodiments of this application does not specifically limit a division manner for running scenarios, as long as values of the running frame rates respectively corresponding to the high frame rate running scenario, the medium frame rate running scenario and the low frame rate running scenario obtained after division decrease in sequence.

During implementation of step S102, the running data may be analyzed to determine a picture motion situation, a user operation frequency, or whether it is a specific high frame rate scenario, thereby determining the running scenario of the client. For example, when at least one of the following conditions is satisfies, the running scenario is determined to be a high frame rate scenario: If there is a picture moving and the user operation frequency exceeds a certain threshold of the number of times, the running scenario is determined to be a particular high frame rate scenario. Otherwise, when there is no picture moving, and the user operation frequency does not exceed the certain threshold of the number of times, and it is not a particular high frame rate scenario, the running scenario is determined to a low frame rate scenario.

Step S103: Determine a target running frame rate of the client based on the running scenario.

During implementation of step S103, different running frame rates may be pre-allocated for different running scenarios based on the highest refresh rate supported by the terminal device. For example, when the highest refresh rate supported by the terminal device is 90 Hz, the running scenario includes the high frame rate running scenario and the low frame rate running scenario, and the value of the running frame rate corresponding to the high frame rate running scenario can be same as the value of the highest refresh rate, that is, 90 FPS, and the running frame rate corresponding to the low frame rate running scenario can be 30 FPS.

After the corresponding running frame rates are allocated for different running scenarios, at step S103, the target running frame rate of the client can be determined according to the determined running scenarios. For example, when the determined running scenario is the high frame rate running scenario, the target running frame rate of the client is 90 FPS; and when the determined running scenario is the low frame rate running scenario, the target running frame rate of the client is 30 FPS. In this way, the frame rate of the client can be dynamically adjusted according to the running data. The power consumption can be effectively reduced while the user experience is guaranteed.

Step S104: Perform, by the client, image outputting according to the target running frame rate, and trigger an operating system of the terminal device to adjust a refresh rate of a screen according to the target running frame rate.

The operating system of the terminal device adjusts the refresh rate of the screen according to the target running frame rate, which means that the operating system of the terminal device first adjusts a value of the refresh rate to be same as the value of the target running frame rate, and displays the adjusted refresh rate. For example, if an original refresh rate of the screen is 40 Hz, and the target running frame rate sent by the client is 90 FPS, the operating system will adjust the refresh rate of the screen to 90 Hz and perform refresh displaying at a frequency of 90 Hz. That is, after the client adjusts the running frame rate according to the running scenario, the operating system of the terminal device can also be triggered to adjust the refresh rate of the screen. During implementation of step S104, there may be two manners to trigger, by means of the dynamic frame rate adjustment by the client, the terminal device to dynamically adjust the refresh rate of the screen: The first manner is passive adjustment by the terminal device, that is, the client instructs the terminal device to adjust the refresh rate according to the target running frame rate. The second manner is active adjustment by the terminal device, that is, the operating system of the terminal device actively monitors a change in the frame rate of the client, and actively adjusts, if a change in the frame rate of the client is monitored, the refresh rate.

In addition, during the dynamic adjustment of the refresh rate of the screen, the terminal device may adjust the value of the refresh rate of the screen to be same as the value of the target running frame rate when a running state of the terminal device is allowable. Or, the terminal device may also adjust the refresh rate of the screen to a certain extent (that is, the value of the refresh rate is adjusted to a part of the value of the target running frame rate, such as 70%) in when the running state of the terminal device is non-allowable. For example, assuming that a current refresh rate of the screen is 30 Hz and the target running frame rate is 90 FPS, if a current temperature of the terminal device is slightly higher (for example, the current temperature of the terminal device is higher than the set temperature threshold), the refresh rate of the screen cannot be increased to 90 Hz (because increasing the refresh rate of the screen to 90 Hz will easily cause the temperature of the terminal device to be extremely high). At this time, the refresh rate can be increased to be less than the value of the target running frame rate, such as 60 Hz.

In the frame rate adjustment method provided in this embodiment of this application, when a client in a terminal device supports dynamic frame rate switching, running data of the client during running at a foreground is acquired, and the client determines a running scenario based on the running data. Different running scenarios can correspond to different target running frame rates, so that after a running scenario is determined, a target running frame rate of the client is then determined based on the running scenario; next, the client performs image outputting according to the target running frame rate, so as to dynamically adjust the running frame rate of the client, thereby achieving real-time dynamic adjustment of the running frame rate by the client based on the running scenario; and furthermore, the dynamic adjustment is also used for triggering the terminal device to adjust a refresh rate of a screen, so that the power consumption can be effectively reduced while the user experience is guaranteed.

Figure 4:
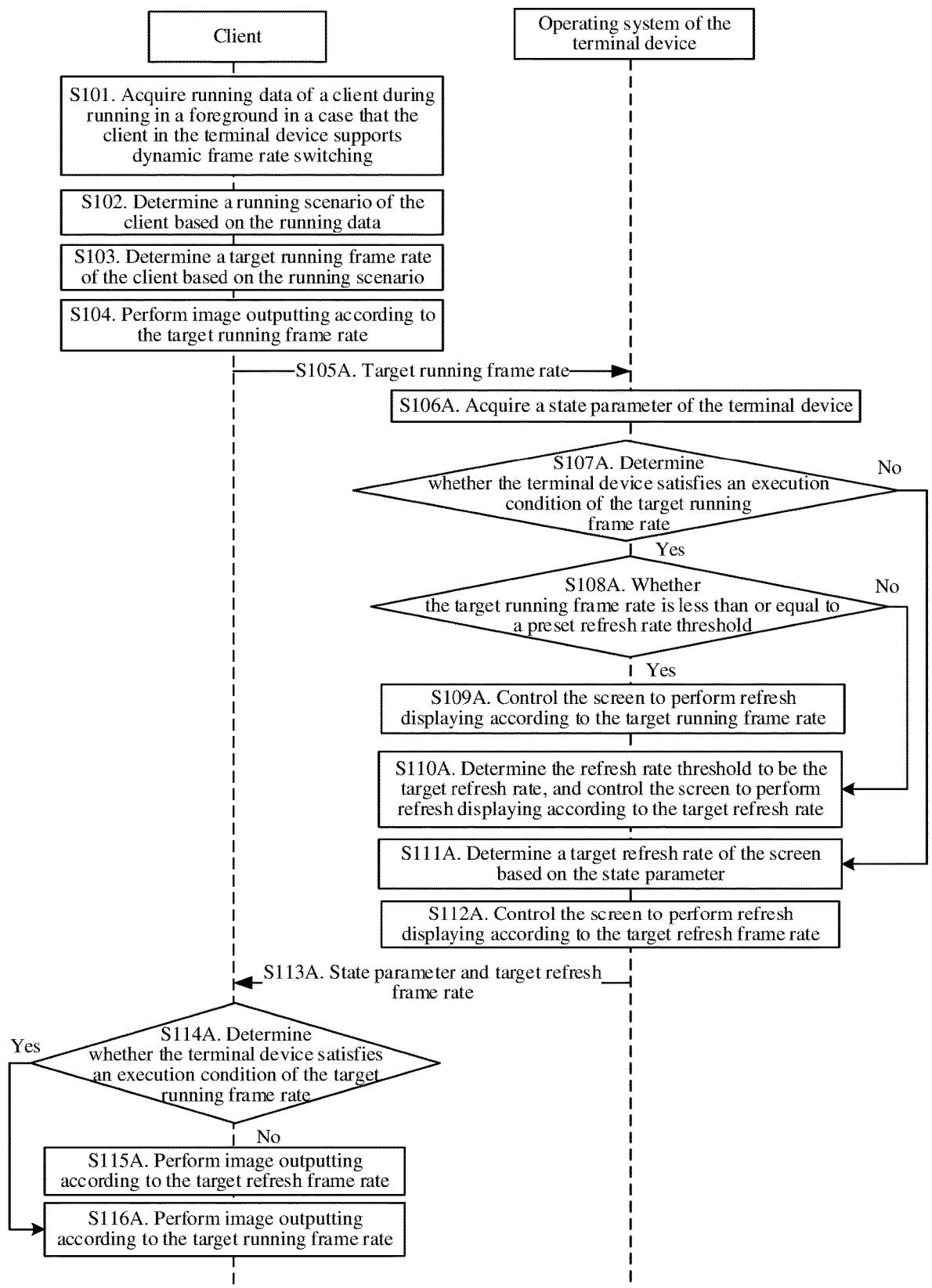
FIG. 4 is a flowchart of a frame rate adjustment method provided by an embodiment of this application.

In some embodiments, after the client performs the dynamic frame rate adjustment, that is, after the client performs the image outputting according to the target running frame rate, the terminal device may be triggered to also correspondingly dynamically adjust the refresh rate. The terminal device may perform active adjustment or passive adjustment based on the dynamic adjustment of the client. If the terminal device passively dynamically adjusts the refresh rate, after step S104, as shown in FIG. 4, the following steps may also be executed:

Step S105A: Send, by the client, the target running frame rate to the operating system of the terminal device.

During implementation of step S105A, after startup, the client requests to establish a communication connection to the operating system of the terminal device. After the communication connection is established successfully, the operating system of the terminal device and the client can interact with each other by information and data.

Step S106A: After receiving the target running frame rate, acquire, by the operating system of the terminal device, a state parameter of the terminal device.

The state parameter of the terminal device may include at least one of the following: a CPU temperature, a CPU usage rate, and remaining power of the terminal device.

Step S107A: Determine, by the operating system of the terminal device, based on the state parameter, whether the terminal device satisfies an execution condition of the target running frame rate.

During implementation of step S107A, a set temperature threshold, usage rate threshold and power threshold may be acquired first. The execution condition of the target running frame rate includes at least one of the following: the CPU temperature is less than the temperature threshold; the CPU usage rate is less than the usage rate threshold; and the remaining power is greater than the power threshold. When it is determined that the terminal device satisfies the execution condition of the target running frame rate, step S108A is executed; and when it is determined that the terminal device does not satisfy the execution condition of the target running frame rate, step S111A is executed.

In the embodiments of this application, different running frame rates correspond to different execution conditions. For example, the execution condition corresponding to a high running frame rate (for example, 144 FPS) may be that the CPU temperature is lower than 40° C. and the CPU usage rate is less than 40%. The execution condition corresponding to a medium running frame rate (for example, 90 FPS) may be that the CPU temperature is lower than 55° C. There is no execution condition for a low frame rate, that is, a low frame rate is executed if neither the execution condition corresponding to a high frame rate nor the execution condition corresponding to a medium frame rate are satisfied.

For example, assuming that the acquired state parameters are as follows: the CPU temperature being 50° C. and the CPU usage rate being 45%, the execution condition of the target running frame rate is that the CPU temperature is lower than 40° C. and the CPU usage rate is less than 40%. Since neither the CPU temperature nor the CPU usage rate meet the requirements for the CPU temperature and CPU usage rate in the execution condition, the terminal device is determined to not satisfy the execution condition of the target running frame rate, and step S111A is executed.

Step S108A: Determine, by the operating system of the terminal device, whether the target running frame rate is less than or equal to a preset refresh rate threshold.

The operating system of the terminal device determines whether the target running frame rate is less than or equal to the preset refresh rate threshold, which means determining whether the value of the target running frame rate is less than or equal to the value of the preset refresh rate threshold. The refresh rate threshold may be set by the user according to own needs. The refresh rate threshold may be less than or equal to the highest refresh rate supported by the terminal device. When the target running frame rate is less than or equal to the refresh rate threshold, step S109A is executed; and when the target running frame rate is greater than the refresh rate threshold, step S110A is executed.

Step S109A: Control, by the operating system of the terminal device, the screen to perform refresh displaying according to the target running frame rate.

The operating system of the terminal device controls the screen to perform refresh displaying according to the target running frame rate, which means that the operating system first adjusts the value of the refresh rate to be same as the value of the target running frame rate and then controls in real time the screen to perform refresh displaying according to the adjusted refresh rate, so as to enhance the user experience.

Step S110A: Determine, by the operating system of the terminal device, the refresh rate threshold to be the target refresh rate, and controls the screen to perform refresh displaying according to the target refresh rate.

On the premise that the state parameter of the terminal device satisfies the execution condition of the target running frame rate, if the value of the target running frame rate is greater than the value of a limited refresh rate threshold, the screen is controlled to perform refresh displaying according to the refresh rate threshold at this time, that is, the terminal device increases the refresh rate to a reachable maximum value to ensure the user experience.

In some embodiments, after step S110A, step S113A and subsequent steps may also be executed.

Step S111A: Determine, by the operating system of the terminal device, a target refresh rate of the screen based on the state parameter.

When the terminal device does not satisfy the execution condition of the target running frame rate, the highest running frame rate corresponding to at least one execution condition that can be satisfied by the state parameter can be determined based on the state parameter, and the value of the highest running frame rate is taken as the value of the target refresh rate of the screen.

According to the above example, assuming that the acquired state parameter is the CPU temperature being 50° C. and the CPU usage rate being 45%, if the state parameter satisfies execution conditions of both 90 FPS and 30 FPS, the greater value from 30 FPS and 90 FPS, i.e., 90 FPS, is determined to be the value of the target refresh rate, and a frequency of the target refresh rate is 90 Hz.

Step S112A: Control, by the operating system of the terminal device, the screen to perform refresh displaying according to the target refresh rate.

Step S113A: Send, by the operating system of the terminal device, the state parameter and the target refresh rate to the client.

The operating system of the terminal device sends the state parameter and the target refresh rate to the client based on the previously established communication connection.

Step S114A: Determine, by the client, based on the state parameter, whether the terminal device satisfies the execution condition of the target running frame rate.

The client can determine, based on the state parameter, whether the terminal device satisfies the execution condition of the target running frame rate, so as to determine whether the terminal device does not adjust the value of the refresh rate to the value of the target running frame rate because the terminal device cannot support the target running frame rate. If it is determined that the terminal device does not satisfy the execution condition of the target frame rate, that is, if it is determined that the terminal device does not adjust the refresh rate because of inability of supporting the target running frame rate, it is determined to reversely adjust the running frame rate at this time, and the step S115A is executed. If it is determined that the terminal device satisfies the execution condition of the target running frame rate, that is, if it is determined that the terminal device does not adjust the refresh rate because of other reasons instead of inability of supporting the target running frame rate, it is determined to not adjust the running frame rate, and step S116A is executed.

Step S115A: Perform, by the client, image outputting according to the target refresh rate.

The client performs image outputting according to the target refresh rate, which means that the client adjusts the value of the running frame rate to be same as the value of the target refresh rate, and performs image outputting according to the adjusted running frame rate.

Step S116A: Perform, by the client, image outputting according to the target running frame rate.

In the frame rate adjustment method provided in this embodiment of this application, after determining the corresponding target running frame rate based on its own running scenario, the client dynamically adjusts its running frame rate to the target running frame rate, and sends the target running frame rate to the operating system of the terminal device by means of the communication connection to the operating system of the terminal device, so as to instruct the operating system of the terminal device to adjust, based on the target running frame rate, the refresh rate of the screen; after receiving the target running frame rate, the operating system of the terminal device determines, based on its own state parameter, whether the screen of the terminal device supports the target running frame rate. If the running state of the terminal device is enough to support the target running frame rate, the value of the refresh rate of the screen can be adjusted to the same as the value of the target running frame rate. If the value of the refresh rate of the screen is decreased to be the same as the value of the target running frame rate, the power consumption of the terminal device can be effectively reduced; and if the value of the refresh rate of the screen is increased to be same as the value of the target running frame rate, the display effect can be enhanced, and the use experience of a user is thus enhanced.

Figure 5:
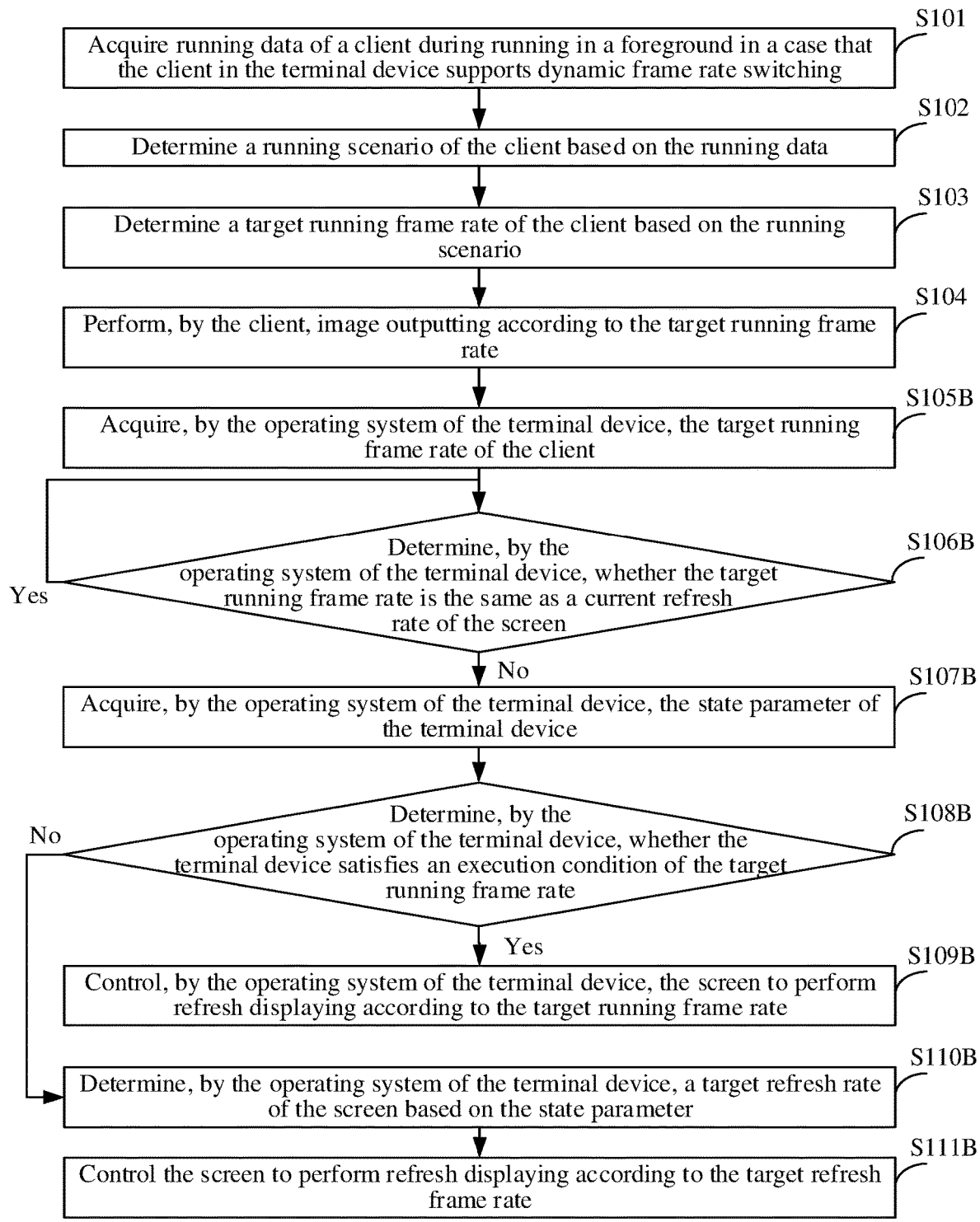
FIG. 5 is a flowchart of a frame rate adjustment method provided by an embodiment of this application.

In some embodiments, if the terminal device actively dynamically adjusts the refresh rate, after step S104, as shown in FIG. 5, the following steps may also be executed:

Step S105B: Acquire, by the operating system of the terminal device, the target running frame rate of the client.

The operating system of the terminal device sends a frame rate acquisition request to the client, so as to acquire the target running frame rate of the client. For example, the operating system of the terminal device may send a frame rate acquisition request to the client once at a preset time interval (for example, a frame rate acquisition request is sent to the client every 1 min), so as to acquire the target running frame rate of the client.

Step S106B: Determine, by the operating system of the terminal device, whether the target running frame rate is the same as a current refresh rate of the screen.

The operating system of the terminal device determines whether the target running frame rate is the same as the current refresh rate of the screen, which means determining whether the value of the target running frame rate is same as the value of the current refresh rate. When the value of the target running frame rate is determined to be same as the value of the current refresh rate of the screen, it indicates that the refresh rate does not need to be adjusted, and step S105B is executed again. When the value of the target running frame rate is determined to be different from the value of the current refresh rate of the screen, it indicates that the refresh rate of the screen needs to be adjusted, and step S107B is executed at this time.

Step S107B: Acquire, by the operating system of the terminal device, the state parameter of the terminal device.

The state parameter of the terminal device acquired by the operating system may include, but not limited to, a CPU temperature, a CPU usage rate and the like.

Step S108B: Determine, by the operating system of the terminal device, based on the state parameter, whether the terminal device satisfies an execution condition of the target running frame rate.

Similar to the implementation process of step S107A, during implementation of step S108B, a set temperature threshold and/or usage rate threshold may be acquired first. The execution condition of the target running frame rate includes at least one of the following: the CPU temperature is less than the temperature threshold; and the CPU usage rate is less than the usage rate threshold. When it is determined that the terminal device satisfies the execution condition of the target running frame rate, step S109B is executed; and when it is determined that the terminal device does not satisfy the execution condition of the target running frame rate, step S110B is executed.

Step S109B: Control, by the operating system of the terminal device, the screen to perform refresh displaying according to the target running frame rate.

The operating system of the terminal device controls the screen to perform refresh displaying according to the target running frame rate, which means that the operating system first adjusts the value of the refresh rate of the screen to be the same as the value of the target running frame rate and then performs refresh displaying according to the adjusted refresh rate.

Step S110B: Determine, by the operating system of the terminal device, a target refresh rate of the screen based on the state parameter.

When the terminal device does not satisfy the execution condition of the target running frame rate, the highest running frame rate corresponding to at least one execution condition that can be satisfied by the state parameter can be determined based on the state parameter, and the value of the highest running frame rate is taken as the value of the target refresh rate of the screen.

Step S111B: Control, by the operating system of the terminal device, the screen to perform refresh displaying according to the target refresh rate.

In the frame rate adjustment method provided by the above-mentioned embodiment, after determining the corresponding target running frame rate based on its own running scenario, the client dynamically adjusts its running frame rate to the target running frame rate, so as to adjust the running frame rate of the client. However, the client will not instruct the operating system of the terminal device to adjust the refresh rate of the screen. Therefore, the operating system of the terminal device can actively monitor whether the running frame rate of the client changes. If it is monitored that the running frame rate of the client changes, the operating system of the terminal device determines the target running frame rate of the client, and determines, based on its own state parameter, whether the terminal device supports the target running frame rate. If the running state of the terminal device is enough to support the target running frame rate, the refresh rate of the screen can be adjusted to the target running frame rate, thus achieving active adjustment of the refresh rate of the screen. Furthermore, if the value of the refresh rate of the screen is decreased to be the same as the value of the target running frame rate, the power consumption of the terminal device can be effectively reduced; and if the value of the refresh rate of the screen is increased to be same as the value of the target running frame rate, the display effect can be enhanced, and the use experience of a user is thus enhanced.

In some embodiments, step S102 may be implemented by the following steps:

Step S1021A: Determine a moving parameter of a virtual object in an outputted picture of the client and an operation frequency of a user based on the running data.

The virtual object may be either a virtual character or a virtual prop.

Step S1022A: When the moving parameter is greater than a first parameter threshold, or when the operation frequency is greater than a first frequency threshold, determine that the client is in a first running scenario.

Step S1023A: When the moving parameter is less than or equal to the first parameter threshold, or when the operation frequency is less than or equal to the first frequency threshold, determine that the client is in a second running scenario.

In a high frame rate mode, an operation of a user can get a faster response, and the user experience of the client will be smoother. Therefore, when it is determined, based on the operation frequency, that the operation frequency is greater than the predetermined first frequency threshold, it can be determined that the client is in the first running scenario, that is, a high frame rate running scenario; when the operation frequency is less than the first frequency threshold, that is, when the operation frequency of the user is not extremely high, for example, when the user conducts an operation, such as purchasing equipment outside a game of a game client, that does not involve a competition or when the user does not conduct any operation, it can be determined that the client is in the second running scenario, that is, a low frame rate running scenario.

When the moving parameter of the virtual object is greater than the first parameter threshold, which indicates that the virtual object moves fast, the high frame rate mode can avoid a non-fluent and blurring picture. Therefore, at this time, it is determined that the client is in the first running scenario, that is, the high frame rate running scenario. When the moving parameter of the virtual object is less than or equal to the first parameter threshold, which indicates that the virtual object moves at a low speed or does not move, it is determined that the client is in the second running scenario at this time, that is, the low frame rate running scenario.

In some embodiments, step S102 may also be implemented by the following steps:

Step S1021B: Determine whether the client plays a recommendation animation based on the running data.

When the client plays the recommended animation, for example, when the game client plays a CG animation, a high frame rate can better show the quality of a game. Or, when a video watching client plays a video recommendation clip, a high frame rate can improve the picture quality. Therefore, the scenario is also determined to be the first running scenario, that is, the high frame rate scenario, even if the above condition is not satisfied.

Step S1022B: When it is determined based on the running data that a recommendation animation is played, determine that the client is in a first running scenario.

Or, the following steps are executed:

Step S1021C: Determine whether a game is over or whether a scenario switching animation is played based on the running data.

For the game client, a user will not be immersed in displayed pictures in those scenarios such as a cutting animation after the game is over and a switching scenario between different copies. Therefore, these scenarios are determined to be the second running scenario, that is, the low frame rate scenario. For the video watching client, advertisements in titles or titles, tail leaders and the like that the user does not pay too much attention to can be determined to be low frame rate scenarios.

Step S1022C: When it is determined based on the running data that a game is over or a scenario switching animation is played, determine that the client is in a second running scenario.

By means of the above-mentioned three implementations, a current running scenario for a client can be determined based on running data of the client, so that the frame rate is dynamically adjusted based on the running scenario.

In some embodiments, before step S101, the following steps may also be executed:

Step S001: Upon startup of the client, determine whether the client supports frame rate adjustment.

When it is determined that the client supports the frame rate adjustment, step S002 is executed; and when it is determined that the client terminal does not support the frame rate adjustment, step S201 is executed.

Step S002: Upon startup, request by the client, to establish a communication connection to the operating system of the terminal device.

Step S003: When the establishment of the communication connection is completed, determine, by the client whether the terminal device supports frame rate adjustment.

When it is determined that the terminal device supports the frame rate adjustment, step S004 is executed; when it is determined that the terminal device does not support the frame rate adjustment, step S101 is executed.

Step S004: Acquire, by the client, the highest refresh rate supported by the terminal device.

The highest refresh rate supported by the terminal device is determined based on hardware of the terminal device, and may be considered to be confirmed when the terminal device leaves the factory.

After an application client acquires the highest refresh rate supported by the terminal device, step S103 may be implemented by the following steps:

Step S1031: When it is determined that the running scenario is the first running scenario, determine the highest refresh rate to be the target running frame rate of the client.

The highest refresh rate is determined to be the target running frame rate of the client, which means that the value of the highest refresh rate is determined to be the value of the target running frame rate of the client.

Step S1032: When it is determined that the running scenario is the second running scenario, determine a preset running frame rate to be the target running frame rate of the client.

The value of the preset running frame rate is less than the value of the highest refresh rate. That is, when it is determined that the running scenario is a high frame rate scenario, the value of the highest refresh rate that can be supported by the hardware of the terminal device is determined to be the value of the target running frame rate of the client, so as to improve the playback quality in the high frame rate scenario. When it is determined that the running scenario is a low frame rate scenario, a preset relatively low running frame rate can be determined to be the target running frame rate of the client, so that without affecting the user experience, the power consumption of the terminal device can be reduced, and the standby time of the terminal device can be prolonged.

In some embodiments, when the client supports the dynamic frame rate adjustment, the client can dynamically adjust the frame rate in real time according to the running data, or the user can manually adjust the frame rate through a frame rate adjustment interface provided by the client. If the client automatically adjusts the frame rate in real time according to the running data, after step S005, step S101 and subsequent steps are executed. If the client manually adjusts the frame rate based on settings of the user, after the client acquires a target running frame rate set by the user, the client performs image outputting based on the target running frame rate, so as to achieve the dynamic adjustment of the running frame rate; and furthermore, the terminal device is triggered based on the dynamic adjustment to dynamically adjust the refresh rate of the screen.

Step S201: Acquire, by the operating system of the terminal device, the state parameter of the terminal device.

Step S202: Collect, by the operating system of the terminal device, image data and user operation data of the client during running within a preset duration.

The preset duration has been preset by the terminal device when the terminal device leaves the factory. Of course, the terminal device may also provide a setting interface of the duration, which is preset by the user according to own needs. The image data may include pixel values of various pixel points of an image rendered and outputted by the client during running, and the user operation data may include trigger time, a trigger position, a pressure value and other data of a user operation.

Step S203: Determine, by the operating system of the terminal device, a target refresh rate of the screen based on the state parameter, the image data and the user operation data.

During implementation of step S203, the running scenario where the client is located can be first determined based on the image data and the user operation data, thus determining the running frame rate corresponding to the running scenario. If the value of the running frame rate is less than the value of the current refresh rate of the terminal device, the value of the running frame rate is determined to the value of the target refresh rate of the screen. When the value of the running frame rate is greater than the value of the current refresh rate of the terminal device, whether the terminal device can satisfy the execution condition of the running frame rate is determined based on the state parameter; if the terminal device can satisfy the execution condition of the running frame rate, the value of the running frame rate is determined as the value of the target refresh rate of the screen; and if the terminal device cannot satisfy the execution condition of the running frame rate, the target refresh rate is determined based on the state parameter. The value of the target refresh rate is greater than or equal to the value of the current refresh rate.

Step S204: Control, by the operating system of the terminal device, the screen to perform refresh displaying according to the target refresh rate.

Through above steps S201 to S204, even if the client does not support dynamic adjustment of a frame rate, the terminal device can make a real-time judgment on the running scenario of the client based on picture data in a running process and the number of user operations, and estimate a corresponding running frame rate of the client based on the determined running scenario, so that the own refresh rate is dynamically adjusted based on the running frame rate; the screen can be refreshed at a high refresh rate in a high frame rate scenario, and the screen can be refreshed at a low refresh rate in a low frame rate scenario; and the power consumption of the terminal device is reduced.

The following describes an exemplary application of this embodiment of this application in an actual application scenario.

The frame rate adjustment method provided in this embodiment of this application is described by taking the game client as an example. The frame rate adjustment method provided in this embodiment of this application includes the following steps:

Step S501: Identify, by the game client, a high frame rate scenario and a low frame rate scenario, and determine a target running frame rate according to the identified scenario.

During scenario identification, according to whether the user needs to frequently conduct a touch-control operation, whether there is a complicated animation, whether there is scenario switching and transferring and the like, the game client can determine whether the current scenario is a scenario where a user can clearly feel a high frame rate, and determine the target running frame rate of the identified scenario. The game client can dynamically adjust the running frame rate during switching of different scenarios. The adjustment can be based on the identified scenario or a real-time running state of the terminal device.

Step S502: Send, by the game client, the identified scenario and the target running frame rate to the terminal device.

During the implementation, an interaction protocol can be defined between the game client and the terminal device, so that the game client can deliver the identified scenario and target running frame rate to the terminal device in real time. At the same time, when the terminal device runs abnormally, for example, when an extremely high temperature causes a decrease in the performance and a failure in supporting a high refresh rate, the terminal device can also notify the game client through the interaction protocol, and the game client adjusts the running frame rate in real time according to received information.

Step S503: After receiving a frame rate adjustment message sent by the game client, adjust by the terminal device, the refresh rate of the screen of the terminal device in real time.

After receiving the frame rate adjustment message sent by the game client, the operating system of the terminal device adjusts the refresh rate of the screen of the terminal device in real time, so as to ensure that no non-fluent pictures will appear in a switching process.

In some embodiments, when the current running state of the terminal device is not enough to support the current running frame rate, the terminal device may notify the game client through a callback interface to reduce the running frame rate in real time.

Division of game scenarios and a dynamic frame rate policy are described below.

I. Scenario division

Low and high running frame rate scenarios are divided according to the impact of different running frame rates in each scenario on actual user experience, and can be distinguished according to the several following factors during implementation.

1. Whether a user conducts an operation.

In a high running frame rate mode, an operation of a use can get a faster response, and the experience in the game will be more fluent. Therefore, a high running frame rate is required if the user conducts an operation.

Different user operation types can correspond to different scenarios, that is to say, different operation types have different requirements on the running frame rate. For example, in a fierce fighting scenario, the user will conduct operations frequently, and a high running frame rate is required to provide faster responses at this time. For a scenario of purchasing equipment outside a competition game, without involving real-time competitions, the user will not conduct operations frequently; and at this time, a good experience can be brought to the user at medium and high running frame rates.

In a case of no operation by the user at all, only a low running frame rate is required to be maintained, which does not affect the user experience and can also reduce the overall power consumption in the game.

2. Whether a picture moves.

Changes in the height and position of a camera will affect the user's perception on the picture. A high running frame rate can make the changes of the camera smoother and reduce dizziness of the user; when a character or prop in a game picture moves rapidly, a high running frame rate can make the movement visually smoother; therefore, when the height and position of the camera change, or the movement of the character and prop causes frequent picture switching, it is in a high running frame rate scenario; when pictures are relatively static or the motion is not obvious, a low running frame rate is maintained, which will not affect the user experience and also reduce the overall power consumption in the game. At this time, it is in a low running frame rate scenario.

3. Special scenario.

In a particular scenario, a user has a clear expectation. For example, in a cutting animation after the game is over, a switching scenario between different copies, and the like, the user will not be immersed in displayed pictures, so that the running frame rate can be switched to a low running frame rate.

In some special scenarios, such as playing a CG animation of a game, a high running frame rate can better reflect the quality of the game, so a high running frame rate is also maintained even if the above conditions are not satisfied.

II. Scene identification and sending.

In a running process of a game, the client can determine the running frame rate of each scenario according to the above defined principle, mark the running frame rate of each scenario in real time, and send the running frame rate to the terminal device.

Figure 6:
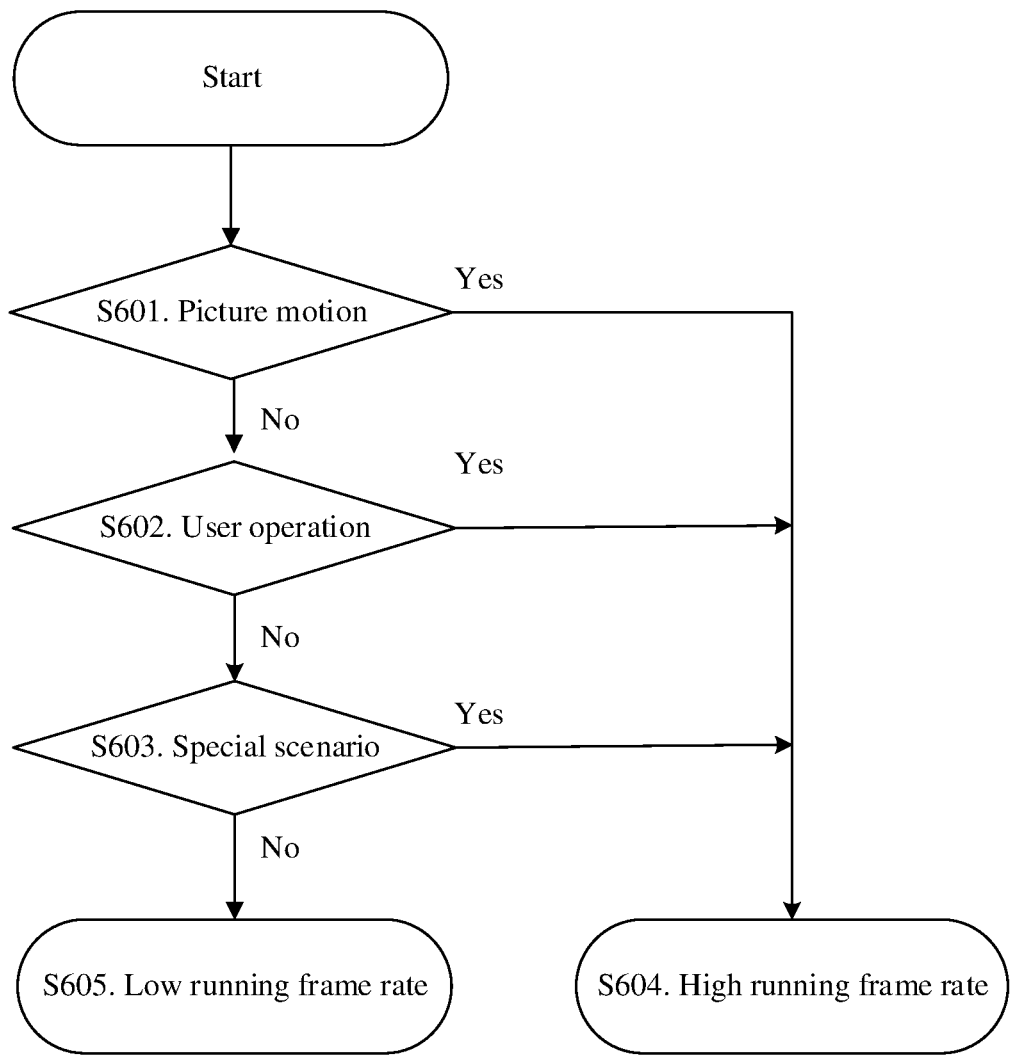
FIG. 6 is a schematic diagram of an implementation flow of scenario division provided by an embodiment of this application.

FIG. 6 is a flowchart of an implementation flow of scenario division provided by an embodiment of this application. As shown in FIG. 6, the flow includes:

Step S601: Determine whether a picture moves.

If it is determined that the picture moves, step S604 is executed to determine that it is in a high running frame rate scenario; and if it is determined that the picture is still, step S602 is executed for further determination.

Step S602: Determine whether there is a user operation.

When it is determined that there is a user operation, step S604 is executed, and it is determined to be a high frame rate scenario; and when it is determined that there is no user operation, step S603 is executed for further determination.

In the embodiments of this application, determining whether there is a user operation may be determining whether there is a user operation and whether the frequency of the user operation is greater than a certain threshold of the number of times; and if there is a user operation and the frequency of the operation is greater than the threshold of the number of times, it is determined that there is a user operation.

Step S603: Determine whether it is a preset high running frame rate special scenario.

When it is determined to be the preset high frame rate special scenario, step S604 is executed to determine that it is a high operation frame rate scenario; and if it is determined not to be the preset high operation frame rate special scenario, step S605 is executed.

Step S604: Determine that it is a high running frame rate scenario.

Step S605: Determine that it is a low running frame rate scenario.

In step S601 to step S605, in order to achieve the best user experience, when any one of the conditions meets the requirement of the high running frame rate, it needs to be identified as a high running frame rate scenario.

In step S601 to step S603, determining the movement of the picture, the user operation and the special scenario in sequence is only an exemplary illustration. In actual implementation, the order of determining the movement of the picture, the user operation and the special scenario is random.

After the game client completes the scenario identification, the game client determines the target running frame rate according to the identified scenario, adjusts a picture rendering frame rate in real time according to the target running frame rate, and then notifies the terminal device in real time to adjust the corresponding refresh rate.

In the embodiments of this application, the game client can not only automatically identify a scenario and adjust a frame rate, but also dynamically adjust the frame rate according to actual needs of a user. When a running state of the terminal device is abnormal, if an extremely high temperature causes the performance to be reduced, the overall running frame rate is also required to be correspondingly reduced.

When the game client receives a running state abnormality returned by the terminal device, the running frame rate is reduced in real time, and an adjustment result is sent back to the terminal device in real time.

The interaction protocol between the game client and the terminal device is described below. Table 1 shows field information sent by the game client to the terminal device:

TABLE 1

Field information sent by the game client to the terminal device

| Name of field | Type of field | Meaning of field | Remarks |
|---|---|---|---|
| Game_name | String | Name of game pack | |
| Target_FPS | Int | Target frame rate | |
| Adjust_src | Int | Reasons of frame rate adjustment | 0: automatic dynamic adjustment<br>1: adjustment by a user<br>2: if the terminal device is abnormal, the game is correspondingly adjusted |
| Scence_Type | Int | Current game scenario type: | 1: Special scenario<br>2: Picture motion scenario<br>3: User operation scenario |

TABLE 2

Field information replied by the terminal device to the game client

| Name of field | Type of field | Meaning of field | Remarks |
|---|---|---|---|
| Game_name | String | Name of game pack | |
| Target_FPS | Int | Target running frame rate issued by the game | |
| Terminal_Target_FPS | Int | Target refresh rate finally adjusted by the terminal device: If the target refresh rate finally adjusted by the terminal device is consistent with that issued by the game, it is not necessary to adjust the game, or it is necessary to correspondingly adjust the game | |
| Terminal_state | Int | Running state of the terminal device:<br>0: The running is normal, and the running frame rate is dynamically adjusted according to game needs<br>1: There is an abnormality indicating an extremely high temperature, so that the running frame rate of the game needs to be reduced<br>2: The running frame rate is not adjusted according to the game needs, but the game is not required to be adjusted with the terminal device | |

Figure 7:
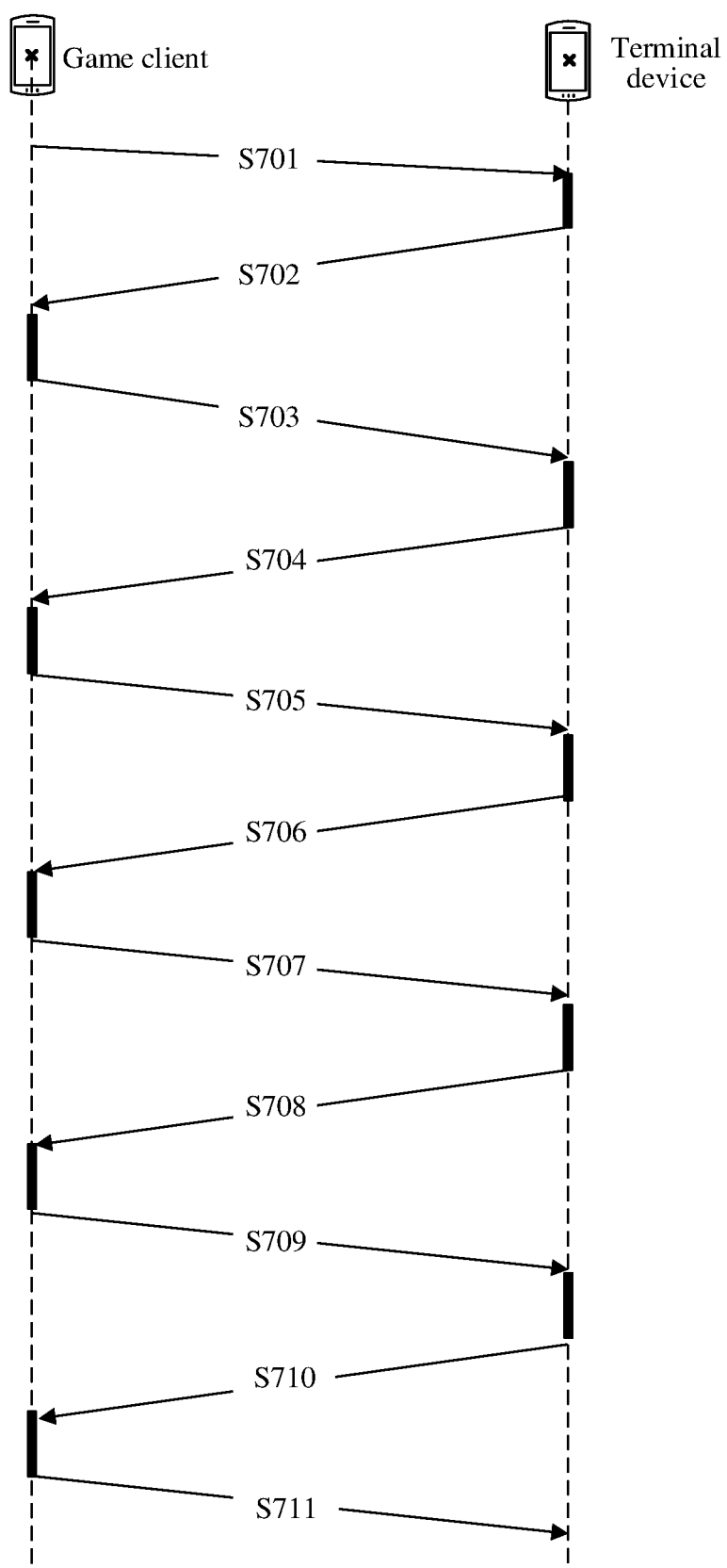
FIG. 7 is a schematic diagram of an interaction flow of a terminal device and a game client provided by an embodiment of this application.

FIG. 7 is a schematic diagram of an interaction flow of a terminal device and a game client provided by an embodiment of this application. As shown in FIG. 7, the interaction flow includes:

Step S701: Query, by the game client, the terminal device for whether the terminal device supports a dynamic frame rate.

During the implementation of step S701, a QeryDynamicFPS interface can be invoked to query whether the terminal device supports the dynamic frame rate. There is no need to input parameters for the interface. Outputs may be: 1: support or not support; and 2: a supported version number.

Step S702: Return, by the terminal device, a dynamic frame rate support situation.

Step S703: Query, by the game client, the terminal device for the currently supported highest refresh rate.

During the implementation of step S703, the currently supported highest refresh rate may be queried from the terminal device by invoking the QueryTerminalMaxFPS interface. There are no input parameters for this interface, and an output parameter is the highest refresh rate that the terminal device can support.

Step S704: Return, by the terminal device, the currently supported highest refresh rate.

Step S705: Request, by the game client, to establish a connection to the terminal device.

During the implementation of step S705, the game client may request the terminal device to establish a connection channel for dynamic frame rate adjustment by invoking a ConnetToTerminal interface, and an output is success or failure.

Step S706: Complete, by the terminal device, the initialization and return that the connection has been established.

At step S701 to step S706, before the game client starts to dynamically adjust the frame rate, the game client handshakes with the terminal device to make an agreement on related protocols and establish and maintain communication links.

Step S707: Determine, by the game client, a current target running frame rate, and send information to the terminal device.

The game client can determine the target running frame rate of the game client by invoking a JudgeTartgetFPS interface, where an input of this interface is the running data of the game, and an output is the target running frame rate. After the game client determines the target running frame rate, the target running frame rate is carried in a message and sent to the terminal device; and a field in the sent information is as shown in Table 1.

Step S708: After receiving the information sent by the game client, dynamically adjust, by the terminal, the refresh rate, and return an adjustment result to the game client.

After receiving the message shown in Table 1, the terminal device invokes the AdjustTerminalTargetFPS interface to adjust the refresh rate of the screen, that is, the input of this interface is an information structure shown in Table 1, and the output is an information structure shown in Table 2. The information structure shown in Table 2 is then fed back to the game client by the terminal device.

Step S709: Perform, by the game client, reverse frame rate adjustment according to the information fed back by the terminal device, and feed back the adjustment result and current real-time scenario information to the terminal device.

After receiving the information structure shown in Table 2 and sent by the terminal device, the game client invokes the AdjustGameTargetFPS interface to dynamically adjust the target running frame rate again. The input of this interface can be the information structure returned by the terminal device and shown in Table 2 and the target running frame rate TargetFPS determined in step S707, and the output is the information structure shown in Table 1, so that the game client can dynamically adjust the target running frame rate again according to the adjustment result returned by the terminal device. TargetFPS and the information returned by the terminal device are comprehensively determined, and the running frame rate of the game is adjusted in real time; and a secondary adjustment result is returned to the terminal device.

Step S710: After receiving the information sent by the game client, dynamically adjust, by the terminal device, the refresh rate.

After receiving the adjustment result sent by the game client, the terminal device adjusts the refresh rate of the screen again according to the adjustment result, so as to dynamically adjust the refresh rate of the screen.

Step S711: Repeat the steps 8-10 during the running of the game until the game is over.

At the end of the game, the game notifies the terminal device to disconnect the link.

At the end of the game, when the user shuts down the game client, the game client can invoke a CloseConnect interface to cut off the communication connection with the terminal device. This interface has no input parameter, but has an output of success or failure.

In this embodiment of this application, the terminal device achieves the ability to perform dynamic frame rate adjustment in real time. The frame rate adjustment can take effect instantaneously, and the user will not feel it. After receiving the request of adjusting the frame rate from the game client, the terminal device determines a current running state. If the temperature is normal and can support a frame rate requirement of the game client, the refresh rate is adjusted normally according to the request sent by the game client.

If the current running state of the terminal device is abnormal, such as extremely high temperature, which leads to a decrease in the performance and a failure of meeting the requirement of the game for a high frame rate, the refresh rate will not be increased temporarily, and the running state will be notified to the game client, so that the game client can follow the terminal device to perform the frame rate adjustment.

According to the frame rate adjustment method provided in this embodiment of this application, the game client can dynamically adjust the running frame rate of the game, and the dynamic frame rate adjustment can be notified to the terminal device in real time, allowing the terminal device to perform real-time adjustment with changes of the game. Therefore, the following phenomenon can be avoided: the waste of power or reduction of the user experience caused by inconsistency between the refresh rate of the screen of the terminal device and the running frame rate of the game since the running frame rate of the game is adjusted. In addition, the terminal device can dynamically adjust the refresh rate in real time according to the running state of the terminal device, which can effectively reduce the power consumption while ensuring the user experience. At the same time, when the performance is low, the game client can also be notified in real time to perform adjustment accordingly. In this way, through the frame rate adjustment method provided in this embodiment of this application, the user can enjoy a fluent high frame rate experience, and an abnormality such as non-fluent pictures when the temperature of the terminal device is too high is also avoided.

In the above implementation, the running frame rate of the game client and the refresh rate of the screen of the terminal device are dynamically adjusted at the same time. In some embodiments, only the game client may perform the dynamic frame rate adjustment, that is, the game client can achieve a dynamic frame rate without relying on the terminal device, and can also gain most of the profits. However, if the terminal device does not perform dynamic frame rate adjustment accordingly, maintaining a high refresh rate on the screen will still bring additional power consumption in a low frame rate scenario.

Or, in some embodiments, it is not necessary to establish a communication connection between the game client and the terminal device. At this time, if the game client performs dynamic frame rate switching, the terminal device can monitor the frame rate switching of the game through rendering of a GPU. After the game client switches the frame rate, the terminal device can also follow the game client to switch the refresh rate following.

Or, in some embodiments, if the game client does not perform dynamic frame rate switching, the terminal device may also perform dynamic refresh rate adjust without relying on the game client. At this time, a game scenario can be dynamically determined in real time by means of collecting game picture changes of the user and touch-control operations of the user in real time, so as to distinguish a high frame rate scenario and a low frame rate scenario and perform dynamic refresh rate switching.

An exemplary structure, in which a frame rate adjustment apparatus 354 provided by an embodiment of this application is implemented as a software module, is continued to be described below. In some embodiments, as shown in FIG. 2, a software module stored in the frame rate adjustment apparatus 354 of a memory 350 may be a frame rate adjustment apparatus in a terminal device 300, and includes: a first acquisition module 3541 configured to acquire running data of the client during running in a foreground when a client in the terminal device supports dynamic frame rate switching; a first determination module 3542 configured to determine a running scenario of the client based on the running data; a second determination module 3543 configured to determine a target running frame rate of the client based on the running scenario; and a first outputting module 3544 configured to control the client to perform image outputting according to the target running frame rate, and trigger an operating system of the terminal device to adjust a refresh rate of a screen according to the target running frame rate.

In some embodiments, the apparatus further includes: a first transmission module configured to transmit the target running frame rate to the operating system of the terminal device; a second acquisition module configured to acquire a state parameter of the terminal device after the target running frame rate is received; and a first control module configured to: when it is determined based on the state parameter that the terminal device satisfies an execution condition of the target running frame rate and the target running frame rate is less than or equal to a preset refresh rate threshold, control the screen to perform refresh displaying according to the target running frame rate.

In some embodiments, the apparatus further includes: a third determination module configured to: when it is determined based on the state parameter that the terminal device does not satisfy the execution condition of the target running frame rate, determine a target refresh rate of the screen based on the state parameter; a second control module configured to control the screen to perform refresh displaying according to the target refresh rate; and a second transmission module configured to transmit the state parameter and the target refresh rate to the client.

In some embodiments, the state parameter includes at least one of the following: a CPU temperature, a CPU usage rate and remaining power of the terminal device; and the execution condition of the target running frame rate includes at least one of the following: the CPU temperature is less than a temperature threshold; the CPU usage rate is less than a usage rate threshold; and the remaining power is greater than a remaining power threshold.

In some embodiments, the apparatus further includes: a second outputting module configured to: when it is determined based on the state parameter that the terminal device does not meet the execution condition of the target running frame rate, perform, by the client, image outputting according to the target refresh rate output; and a third outputting module configured to: when it is determined based on the state parameter that the test device satisfies the execution condition of the target running frame rate, perform, by the client, image outputting according to the target running frame rate.

In some embodiments, the apparatus further includes: a fourth obtaining module, configured to obtain the target running frame rate of the client; a fifth obtaining module, configured to obtain a state parameter of the terminal device when an operating system of the terminal device determines that the target running frame rate is different from the current refresh rate of the screen; the third control module is configured to control the screen to refresh and display according to the target running frame rate when it is determined based on the state parameter that the terminal device satisfies the execution condition of the target running frame rate.

In some embodiments, the first determination module is further configured to determine a moving parameter of a virtual object in an outputted picture of the client and an operation frequency of a user based on the running data; when the moving parameter is greater than a first parameter threshold or when the operation frequency is greater than a first frequency threshold, determine that the client is in a first running scenario; and when the moving parameter is less than or equal to the first parameter threshold, and the operation frequency is less than or equal to the first frequency threshold, determine that the client is in a second running scenario.

In some embodiments, the first determination module is further configured to: when it is determined based on the running data that a recommendation animation is played, determine that the client is in the first running scenario; or, when it is determined based on the running data that a game is over or a scenario switching animation is played, determine that the client is in the second running scenario.

In some embodiments, the apparatus further includes: a connection establishment module configured to: after startup, request, by the client, to establish a communication connection with the operating system of the terminal device; a sixth determination module configured to: when the establishment of the communication connection is completed, determine whether the terminal device supports frame rate adjustment; a sixth acquisition module configured to: when it is determined that the terminal device supports the frame rate adjustment, acquire the highest refresh rate supported by the terminal device; and a seventh determination module configured to determine a correspondence relationship between a scenario level and a running frame rate based on the highest refresh rate and a preset scenario level.

In some embodiments, the second determination module is further configured to: when it is determined that the running scenario is the first running scenario, determine the highest refresh rate to be the target running frame rate of the client; and when it is determined that the running scenario is the second running scenario, determine a preset running frame rate to be the target running frame rate of the client, the preset running frame rate being less than the highest refresh rate.

In some embodiments, the apparatus further includes a seventh acquisition module configured to: when the client in the terminal device does not support the dynamic frame rate switching, acquire a state parameter of the terminal device; a data collection module configured to collect image data and user operation data of the client during running within a preset duration; an eighth determination module configured to determine a target refresh rate of the screen based on the state parameter, the image data and the user operation data; and a fourth control module configured to control the screen to perform refresh displaying according to the target refresh rate.

The description of the apparatus embodiments of this application is similar to the description of the foregoing method embodiment, and the apparatus embodiment has beneficial effects similar to those of the method embodiment, and therefore details are not described. Refer to descriptions in the method embodiments of this application for technical details undisclosed in the apparatus embodiments of this application.

An embodiment of this application provides a storage medium storing an executable instruction. When the executable instruction is executed by a processor, the processor is caused to perform the method, for example, the method shown in FIG. 4 provided in the embodiments of this application.

In some embodiments, the storage medium may be a computer-readable storage medium such as a ferromagnetic random access memory (FRAM), a read only memory (ROM), a programmable read-only memory (PROM), an erasable programmable read-only memory (EPROM), an electrically erasable programmable read-only memory (EEPROM), a flash memory (Flash Memory), a magnetic storage, an optic disc, or a compact disc-read only memory (Compact Disc-Read Only Memory, CD-ROM); or may be various devices including one or any combination of the memories described above.

In some embodiments, the executable instructions may be written in any form of programming language (comprising a compiled or interpreted language, or a declarative or procedural language) by using the form of a program, software, a software module, a script or code, and may be deployed in any form, comprising being deployed as an independent program or being deployed as a module, a component, a subroutine, or another unit suitable for use in a computing environment.

In an example, the executable instructions may, but do not necessarily, correspond to a file in a file system, and may be stored in a part of a file that saves another program or other data, for example, be stored in one or more scripts in a HyperText Markup language (HTML) file, stored in a file that is specially used for a program in discussion, or stored in the plurality of collaborative files (for example, be stored in files of one or modules, subprograms, or code parts). In an example, the executable instructions may be deployed to be executed on a computing device, or deployed to be executed on a plurality of computing devices at the same location, or deployed to be executed on a plurality of computing devices that are distributed in a plurality of locations and interconnected by using a communication network.

What is claimed is:

1. A method, which is implemented by a terminal device, the method comprising:
   acquiring running data of a client during running in a foreground when the client in the terminal device supports dynamic frame rate switching;
   determining a running scenario of the client based on the running data by:
      determining a moving parameter of a virtual object in an outputted picture of the client and an operation frequency of a user based on the running data;
      in response to the moving parameter being greater than a first parameter threshold, or in response to the operation frequency being greater than a frequency threshold, determining that the client is in a first running scenario; and
      in response to the moving parameter being less than or equal to the first parameter threshold, or in response to the operation frequency being less than or equal to the frequency threshold, determining that the client is in a second running scenario;
   determining a target running frame rate of the client based on the running scenario; and
   performing, by the client, image outputting according to the target running frame rate, and triggering an operating system of the terminal device to adjust a refresh rate of a screen according to the target running frame rate.

2. The method according to claim 1, wherein after the performing, by the client, image outputting according to the target running frame rate, the method further comprises:
   transmitting, by the client, the target running frame rate to the operating system of the terminal device, and triggering the operating system of the terminal device to acquire a state parameter of the terminal device; and
   controlling the screen to perform refresh displaying according to the target running frame rate in response to determining, based on the state parameter, that the terminal device satisfies an execution condition of the target running frame rate and that the target running frame rate is less than or equal to a set refresh rate threshold.

3. The method according to claim 2, further comprising:
   determining, by the operating system of the terminal device, a target refresh rate of the screen based on the state parameter in response to determining, based on the state parameter, that the terminal device does not satisfy the execution condition of the target running frame rate;
   controlling the screen to perform refresh displaying according to the target refresh rate; and
   transmitting, by the operating system of the terminal device, the state parameter and the target refresh rate to the client.

4. The method according to claim 2, wherein the state parameter comprises at least one: a central processing unit (CPU) temperature, a CPU usage rate, or a remaining power of the terminal device;
   the execution condition of the target running frame rate comprises at least one:
   the CPU temperature is less than a temperature threshold;
   the CPU usage rate is less than a usage rate threshold; or
   the remaining power is greater than a remaining power threshold.

5. The method according to claim 4, further comprising:
   performing, by the client, image outputting according to the target refresh rate in response to the client determining, based on the state parameter, that the terminal device does not satisfy the execution condition of the target running frame rate; and
   performing, by the client, image outputting according to the target running frame rate in response to the client determining, based on the state parameter, that the terminal device satisfies the execution condition of the target running frame rate.

6. The method according to claim 1, wherein after the performing, by the client, image outputting according to the target running frame rate, the method further comprises:
   acquiring, by the operating system of the terminal device, the target running frame rate of the client;

acquiring a state parameter of the terminal device in response to the operating system of the terminal device determining that the target running frame rate is different from a current refresh rate of the screen; and controlling the screen to perform refresh displaying according to the target running frame rate in response to determining, based on the state parameter, that the terminal device satisfies an execution condition of the target running frame rate.

7. The method according to claim 1, further comprising:
upon startup of the client, requesting, by the client, to establish a communication connection to the operating system of the terminal device; and
acquiring, by the client, the highest refresh rate supported by the terminal device in response to the communication connection being established and the client determining that the terminal device supports frame rate adjustment.

8. The method according to claim 7, wherein the determining a target running frame rate of the client based on the running scenario comprises:
determining the highest refresh rate to be the target running frame rate of the client in response to determining that the running scenario is the first running scenario; and
determining a preset running frame rate to be the target running frame rate of the client in response to determining that the running scenario is the second running scenario, wherein the preset running frame rate is less than the highest refresh rate.

9. The method according to claim 1, further comprising:
acquiring, by the operating system of the terminal device, a state parameter of the terminal device when the client in the terminal device does not support dynamic frame rate switching;
collecting, by the operating system of the terminal device, image data and user operation data of the client during running within a preset duration;
determining, by the operating system of the terminal device, a target refresh rate of the screen based on the state parameter, the image data and the user operation data; and
controlling, by the operating system of the terminal device, the screen to perform refresh displaying according to the target refresh rate.

10. An apparatus comprising:
a memory storing a plurality of instructions; and
a processor configured to execute the plurality of instructions, and upon execution of the plurality of instructions, is configured to:
acquire running data of a client during running in a foreground when the client in a terminal device supports dynamic frame rate switching;
determine a running scenario of the client based on the running data;
determine a target running frame rate of the client based on the running scenario; and
perform, by the client, image outputting according to the target running frame rate, and trigger an operating system of the terminal device to adjust a refresh rate of a screen according to the target running frame rate; and
control the screen to perform refresh displaying according to the target running frame rate in response to a determination, based on a state parameter of the terminal device, that the terminal device satisfies an execution condition of the target running frame rate.

11. The apparatus according to claim 10, wherein after the performance of, by the client, image outputting according to the target running frame rate, the processor, upon execution of the plurality of instructions, is further configured to:
transmit, by the client, the target running frame rate to the operating system of the terminal device, and trigger the operating system of the terminal device to acquire the state parameter of the terminal device
wherein the processor is configured to control the screen to perform refresh displaying according to the target running frame rate further in response to a determination that the target running frame rate is less than or equal to a set refresh rate threshold.

12. The apparatus according to claim 10, wherein after the performance of, by the client, image outputting according to the target running frame rate, the processor, upon execution of the plurality of instructions, is further configured to:
acquire, by the operating system of the terminal device, the target running frame rate of the client; and
acquire the state parameter of the terminal device in response to the operating system of the terminal device determining that the target running frame rate is different from a current refresh rate of the screen.

13. The apparatus according to claim 10, wherein in order to determine the running scenario of the client based on the running data, the processor, upon execution of the plurality of instructions, is configured to:
determine a moving parameter of a virtual object in an outputted picture of the client and an operation frequency of a user based on the running data;
in response to the moving parameter being greater than a first parameter threshold, or in response to the operation frequency being greater than a first frequency threshold, determine that the client is in a first running scenario; and
in response to the moving parameter being less than or equal to the first parameter threshold, or in response to the operation frequency being less than or equal to the first frequency threshold, determine that the client is in a second running scenario.

14. The apparatus according to claim 10, wherein in order to determine a running scenario of the client based on the running data, the processor, upon execution of the plurality of instructions, is configured to:
in response to a determination, based on the running data, that a recommendation animation is played, determine that the client is in a first running scenario; or
in response to a determination, based on the running data, that a game is over or a scenario switching animation is played, determine that the client is in a second running scenario.

15. The apparatus according to claim 10, wherein the processor, upon execution of the plurality of instructions, is further configured to:
upon startup of the client, request, by the client, to establish a communication connection to the operating system of the terminal device; and
acquire, by the client, the highest refresh rate supported by the terminal device in response to the communication connection being established and the client determining that the terminal device supports frame rate adjustment.

16. The apparatus according to claim 10, wherein the processor, upon execution of the plurality of instructions, is further configured to:

acquire, by the operating system of the terminal device, the state parameter of the terminal device when the client in the terminal device does not support dynamic frame rate switching;

collect, by the operating system of the terminal device, image data and user operation data of the client during running within a preset duration;

determine, by the operating system of the terminal device, a target refresh rate of the screen based on the state parameter, the image data and the user operation data; and control, by the operating system of the terminal device, the screen to perform refresh displaying according to the target refresh rate.

17. A non-transitory computer readable storage medium storing a plurality of executable instructions, the plurality of executable instructions, when executed by a processor, is configured to cause the processor to:

acquire running data of a client during running in a foreground when the client in a terminal device supports dynamic frame rate switching;

determine a running scenario of the client based on the running data;

determine a target running frame rate of the client based on the running scenario;

perform, by the client, image outputting according to the target running frame rate, and trigger an operating system of the terminal device to adjust a refresh rate of a screen according to the target running frame rate; and control the screen to perform refresh displaying according to the target running frame rate in response to a determination, based on a state parameter of the terminal device, that the terminal device satisfies an execution condition of the target running frame rate and that the target running frame rate is less than or equal to a set refresh rate threshold.

18. The non-transitory computer readable storage medium according to claim 17, wherein after the performance of, by the client, image outputting according to the target running frame rate, the plurality of executable executions, when executed by the processor, is further configured to cause the processor to:

transmit, by the client, the target running frame rate to the operating system of the terminal device, and trigger the operating system of the terminal device to acquire the state parameter of the terminal device.

* * * * *